United States Patent [19]

Zelkowitz

[11] Patent Number: 4,716,493
[45] Date of Patent: Dec. 29, 1987

[54] ELECTRONIC INSTRUMENT HOUSING

[76] Inventor: Philip Zelkowitz, 6518 N. Kilpatrick, Lincolnwood, Ill. 60646

[21] Appl. No.: 736,236

[22] Filed: May 21, 1985

[51] Int. Cl.⁴ ............................................. H05K 7/20
[52] U.S. Cl. .................................. 361/383; 312/7.2; 358/248; 358/254; 361/424; 361/399
[58] Field of Search .............. 361/383, 384, 395, 399, 361/390, 424; 312/7.2, 223; 340/367; 358/248, 254; 174/52 R; 220/4 R

[56] References Cited

U.S. PATENT DOCUMENTS 2,855,257 10/1958 Barker et al. ..................... 220/4 R
3,703,323 11/1972 Gallas et al. ......................... 312/7.2

Primary Examiner—A. D. Pellinen
Assistant Examiner—Gregory D. Thompson
Attorney, Agent, or Firm—Hill, Van Santen, Steadman & Simpson

[57] ABSTRACT

A housing for electronic and associated apparatus such as a computer monitor console, or the like, having a casing defing a chamber with a front end and a back end. The front end of the casing has an opening for mounting an electronic instrument, such as a CRT, in the casing in visibly exposed relation to the opening. The back end of the casing has an access port through which all apparatus within the chamber is accessible, and a replaceable closure is removably secured to the casing about the port. The casing and closure may be made from aluminum parts, and all joints are snug against radiation leakage. A shelf plate on the inner side of the closure projects inwardly within the chamber and supports some of the apparatus. There may be an auxiliary support for the inner end of the shelf plate.

10 Claims, 6 Drawing Figures

ELECTRONIC INSTRUMENT HOUSING

BACKGROUND OF THE INVENTION

1. Field of the Invention

This invention relates to electronic instrument housings, and is more particularily concerned with such housings that are especially useful for housing computer monitors.

At least some electronic instruments, such as may involve the operation of CRT's (cathode ray tubes), may generate radio frequency radiation which, if permitted to leak freely into the surrounding atmosphere, may interfere with the operation of other instruments in that environment.

2. Prior Art

Considerable effort has been expended toward containing the undesirable effects of such radiation. One expedient has been to, in effect, encapsulate the radiation producing apparatus within a carefully shielded formed rigid plastic enclosure with all joints carefully sealed against radiation leakage.

A serious problem with that plastic enclosure expedient has been the difficulty of access to the apparatus within the enclosure should that be necessary for any reason. Also, when such access is gained, it has been necessary to seriously damage the radiation screen or shield material where the parts of the enclosure have been separated to open the enclosure.

Such constructions are especially troublesome in computer monitors which must necessarily be compact and the CRT, which provides a visual display for the associated computer, has a considerable amount of electronic and electrical apparatus enclosed therewith. At times, it may be necessary to perform some service or cleaning operation in respect to the electronic and electrical apparatus. In one common computer monitor, the housing has consisted of a two-part shell which, in order to gain access into the housing, requires separating the shell halves and breaking the shielding means at the separation. Separation of the housing, but also access to the apparatus within, has been an awkward and time consuming maneuver. The necessary effort and expense must be expended for replacing or repairing the shielding means at the housing joints when the enclosure is reclosed, or radiation leakage may result during operation of the apparatus.

SUMMARY OF THE PRESENT INVENTION

An important object of the present invention is to overcome the disadvantages, drawbacks, inefficiencies, limitations, shortcomings and problems inherent in prior constructions and to provide a new and improved electronic instrument housing.

Another object of the invention is to provide a new and improved electronic instrument housing into which access is enabled by way of an opening or port having a readily replaceable closure, and wherein the joint between the closure and the housing is automatically sealed against radiation leakage.

A further object of the invention is to provide a new and improved electronic instrument housing, having a replaceable access port closure which is adapted to support at least some of the apparatus within the housing.

Still another object of the invention is to provide a new and improved electronic instrument housing which is formed from a material serving as a radiation shield.

In a preferred form, the invention provides in a housing for electronic and associated apparatus, such as for a computer monitor or the like, a casing defining a chamber and having a front end and a back end. Means are provided for mounting electronic and associated apparatus within the chamber. The front end of the casing has an opening and means for mounting an electronic instrument such as a CRT in the casing in a visibly exposed relation at the opening. The back end of the casing has an access opening or port through which all apparatus within the chamber is accessible. There is a replaceable closure for the access opening, and means for replaceably securing the closure to the casing.

The material of the casing may in and of itself, serve as a radiation shield.

Radiation leakage through the joint between the casing and the closure for the access port is automatically sealed against radiation leakage upon mounting the closures in place.

Means are provided for enabling the access opening closure to support at least some of the apparatus within the housing chamber.

BRIEF DESCRIPTION OF THE DRAWINGS

Other objects, features and advantages of the invention will be readily apparent from the following description of a representative embodiment thereof, taken in conjunction with the accompanying drawings, although variations and modifications may be effected without departing from the spirit and scope of the novel concepts embodied in the disclosure and in which.

DETAILED DESCRIPTION

Figure 1:
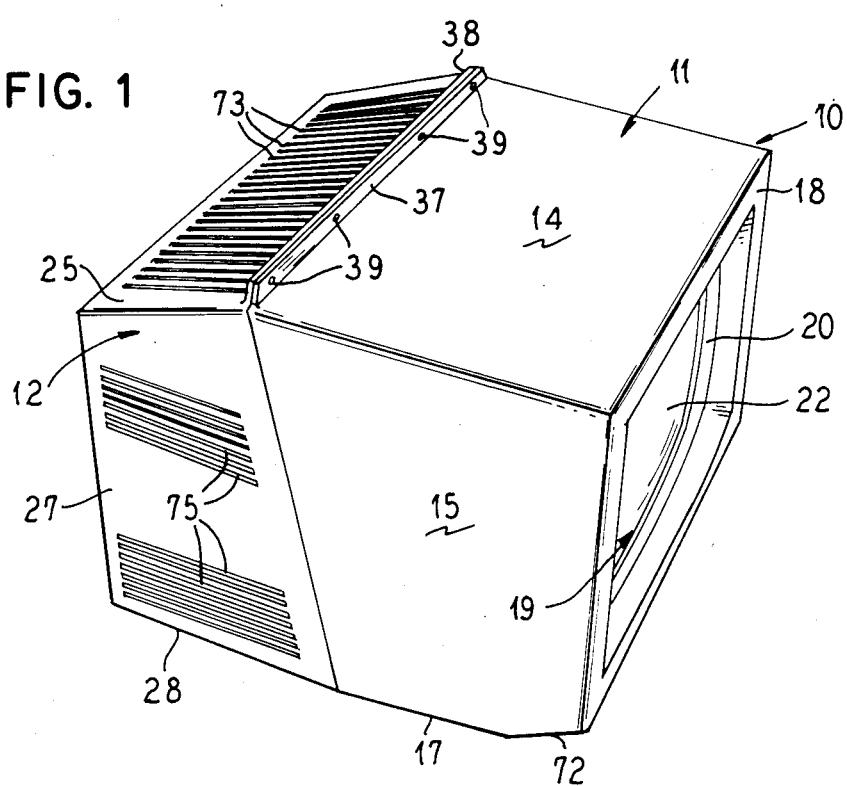
FIG. 1 is a perspective view of an embodiment of the present invention, especially adapted for electronic apparatus such as a computer monitor.
Figure 2:
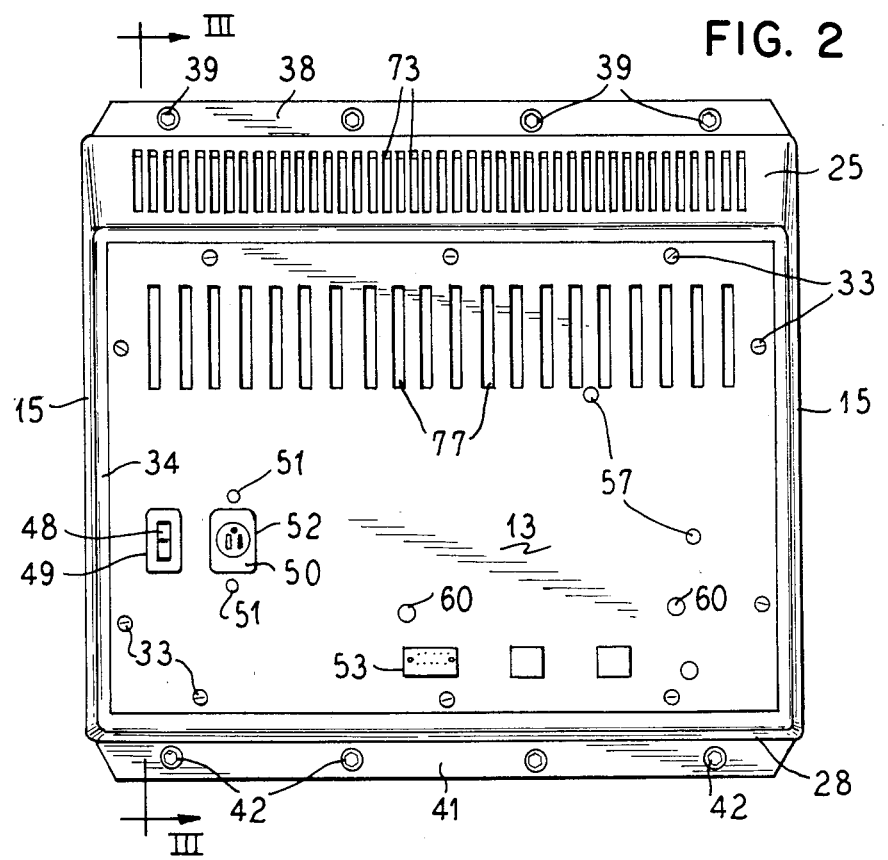
FIG. 2 is a rear elevational view of the housing of FIG. 1.

By way of example, a housing 10 (FIG. 1) is especially adapted to serve as a computer monitor housing. To this end, the improved housing 10 preferably comprises just three principal parts, namely a front part 11, a rear part 12 and a closure door 13 (FIG. 2) for a rear access opening or port 30 into the housing. Although the parts of the housing 10 may be made from any of a number of materials, such as form sustaining vinyl or other plastic material, wood, sheet metal, rigid expanded foam plastic, and the like, substantial advantages are attained by forming the parts from aluminum alloy which has light weight relative to section modulus can be readily formed by molding or casting, and has inherent radiation shielding properties. By forming the housing parts as aluminum castings, they can be with substantial accuracy provided with desired geometric shapes, requiring a minimum, if any, machining for accurate close fit. The front and rear parts 11 and 12 are desirably fabricated as separable shells, and the door 13 comprises a panel.

Figure 3:
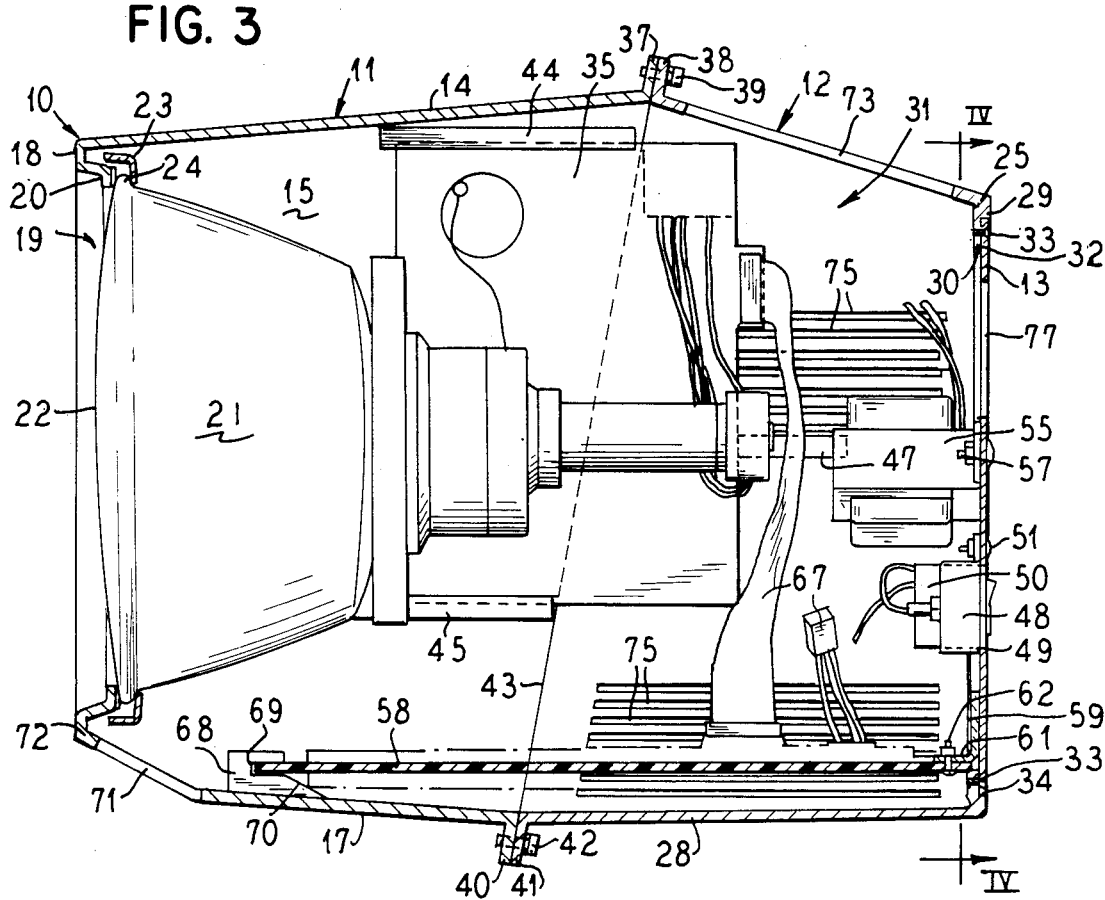
FIG. 3 is a longitudinal sectional elevational detail view taken substantially along the line III—III in FIG. 2.
Figure 4:
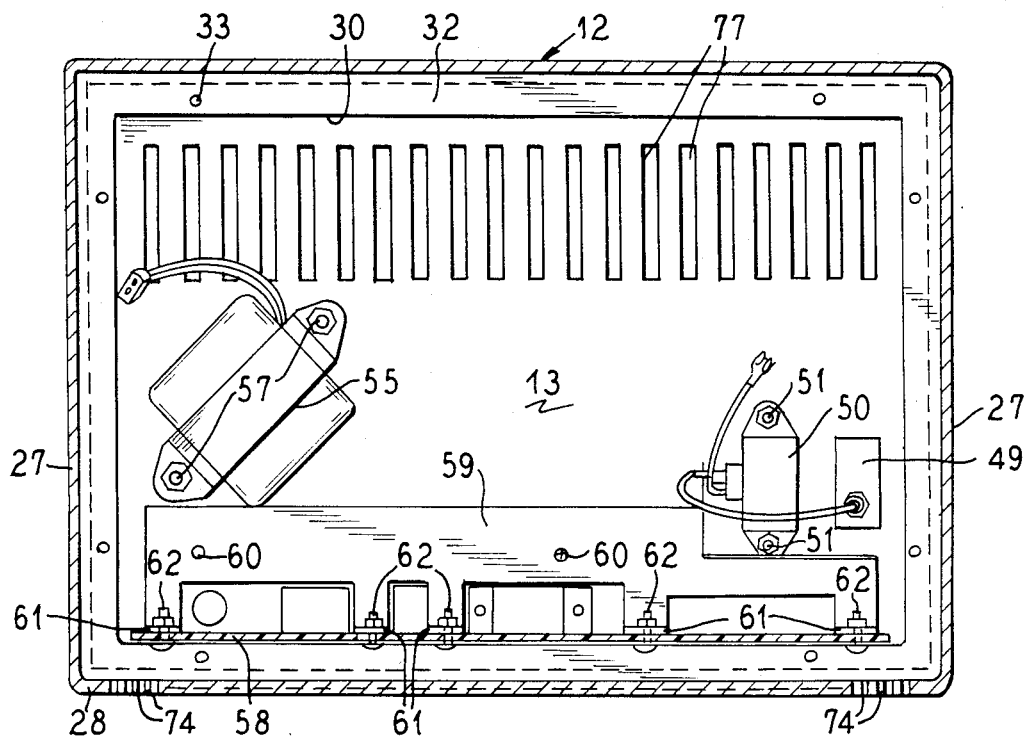
FIG. 4 is a vertical sectional detail view taken substantially along the line IV—IV in FIG. 3.
Figure 5:
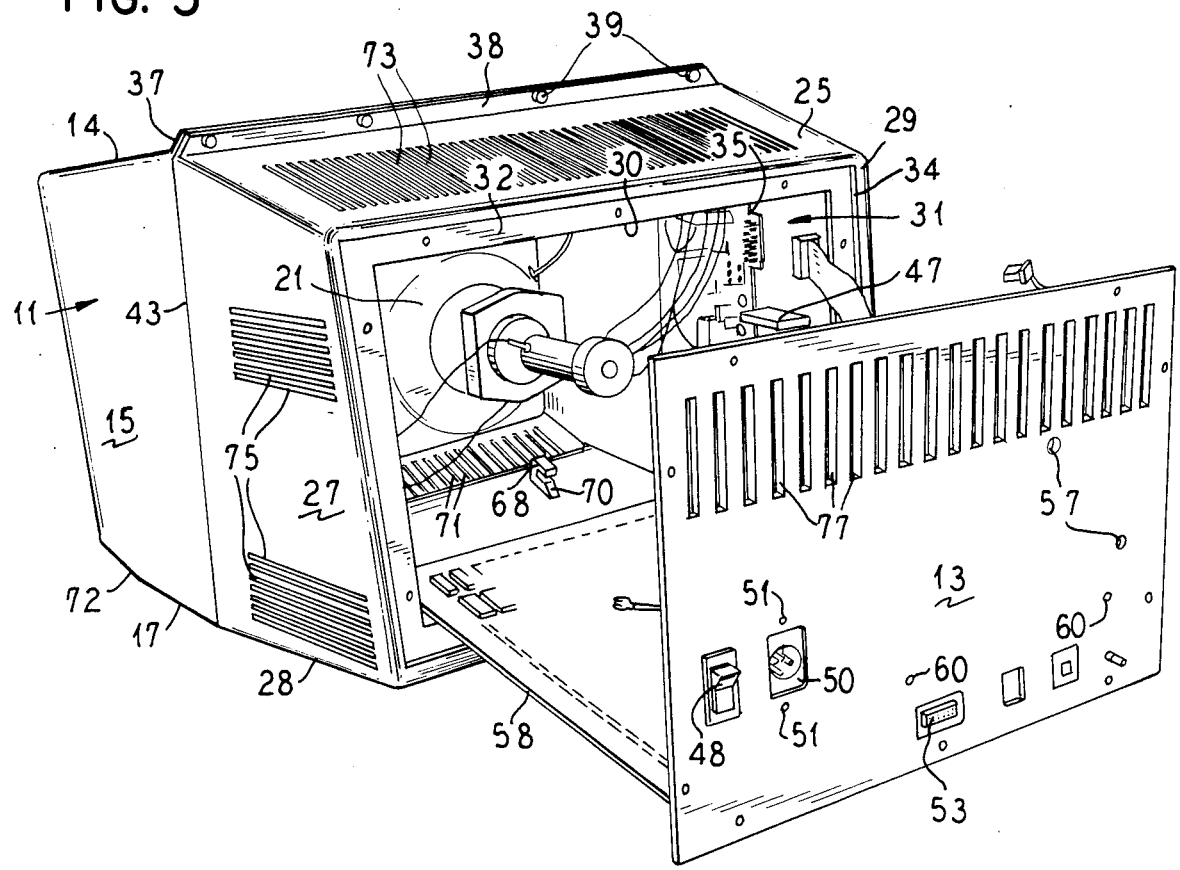
FIG. 5 is a perspective view showing the access port closure in an open position relative to the housing.
Figure 6:
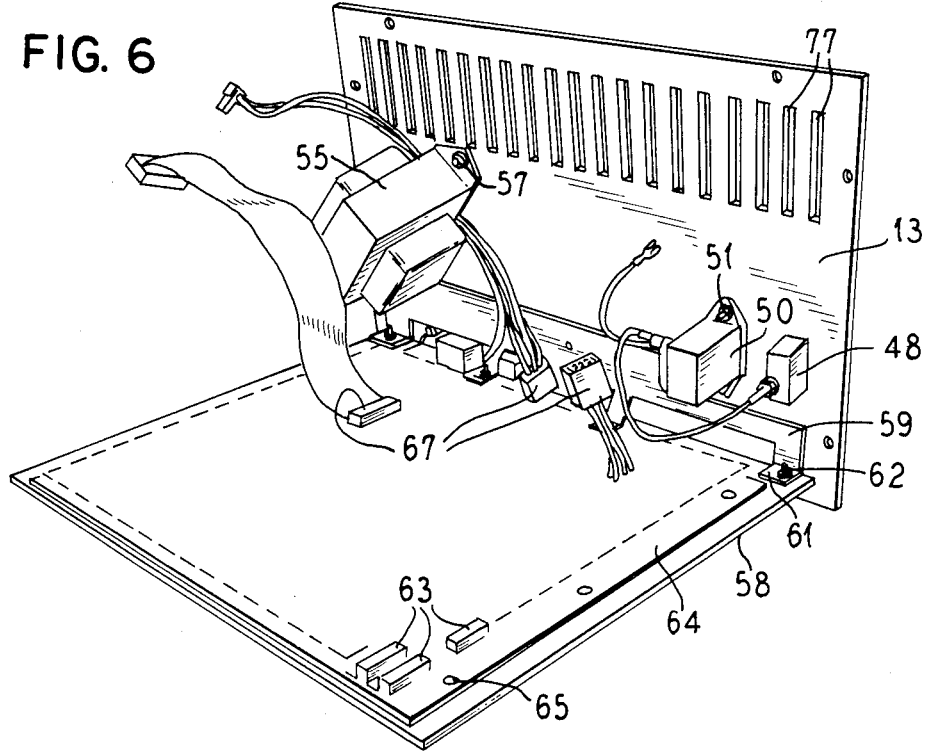
FIG. 6 is a perspective view of the access port closure showing it carrying some of the apparatus which is normally housed within the chamber of the housing.

For computer monitor housing purposes, the shell of the front part 11 has a top wall 14 (FIGS. 1 and 3), opposite side walls 15 (FIGS. 1 and 5) which are in this instance of the same configuration, and a bottom wall 17 (FIGS. 3 and 5). A front end wall 18 (FIGS. 1 and 3) has throughout most of its area an inset angular flange 20 providing a frame on which is mounted an electronic instrument such as a CRT 21 in a visibly exposed relation in respect to its display face 22. Means such as a harness 23 secure a rim 24 about the CRT face 22 to the angular frame 20 in a thoroughly stable manner, for rearward projection in generally cantilever fashion within the housing 10 of the rearwardly extending structure customarily on a CRT.

In a complementary shell construction, the rear part 12 of the housing 10 comprises a top wall 25 (FIGS. 1-5), similar opposite side walls 27, a bottom wall 28 and a rear wall 29 which is desirably in the form of a narrow frame about a back end access opening or port 30. Herein the access opening or port 30 is large enough so that all apparatus, within a generous size chamber 31 defined within the casing of the housing 10, is accessible through the access opening 30. About the access opening 30, the rear wall 29 has an inset seat 32 against which the margins of the door 13 are received and to which the door margins are arranged to be secured snuggly removably by means of screws 33. Retention of the door 33 against lateral displacement is assured by means of a shoulder 34 extending about the inset seat 32. Through this arrangement, the inset seat 32 and the shoulder 34 provide a continuous groove entirely about the access opening or port 30 for receiving the margins of the door 13 in a complete, unbroken joint in the housing rear wall 29 and which will thoroughly preclude radiation leakage through the joint.

For convenience in mounting the CRT 21 and an associated electronic gear motherboard 35, or for replacement thereof if that ever becomes necessary, the front and rear housing parts 11 and 12 are desirably constructed to be separably connected in snug edge-to-edge relation. For this purpose, the rear edge of the top wall 14 has an upstanding attachment flange 37, and the front edge of the top wall 25 has a complementary upwardly extending attachment flange 38. Bolts 39 are provided for securing the flanges 37 and 38 together. Similarly, the rear edge of the bottom wall 17 is provided with a downwardly extending attachment flange 40 which is arranged to be engaged in face-to-face relation by a complementary downwardly extending attachment flange 41 on the front edge of the bottom wall 28. Bolts 42 are provided to secure the flanges 40 and 41 together. Snug separable joints 43 are provided by and between the contiguous edges of the side walls 15 and 27 at each side of the housing 10.

To receive the motherboard 35 removably, there is provided a top track member 44 (FIG. 3), attached to one of the side walls 15 of the housing part 11 and extends in a front to rear direction adjacent to the top wall 14. A complementary bottom track member 45 is also attached to this one side wall spaced below the track member 44. The track members 44 and 45 are respectively engagable slidably by upper and lower edges of the motherboard 35. After the rear part 12 of the housing has been secured in place, a lug 47 carried by the wall 27 which is aligned with the wall 15 on which the motherboard 35 is mounted engages the rear edge of the motherboard 35 and retains the same against sliding rearwardly from the tracks 44 and 45.

Not only does the door 13 provide for easy, convenient access into the chamber 31, but it also serves conveniently as means for supporting apparatus within the chamber 31, and for ready mounting and removal of such apparatus with the door. Some of the apparatus which may be mounted directly on the door 13 are an on/off control switch unit 48 associated with an apperture 49 in the door 13 for ready manipulation from the outside of the door. Adjacent thereto may be mounted a power connector 50 secured in place on the door 13 as by means of screws 51 in a complementary opening 52 for ready connection with a power source cable connector. A connector 53, mounted in a suitable complementary apperture in the door 13 may be for the purpose of coupling a computer with the electronic apparatus in the housing. On its inner face, the door 13 may advantageously carry a transformer 55 secured thereto as by means of screws 57 (FIGS. 2, 4, 5 and 6). It will be understood that all of the apparatus secured to the door 13 will be suitably electrically insulated therefrom, where, in the preferred mode, the door is of metal and more particularly aluminum. Where the various apparatus units are not in and of themselves housed in dielectric material, suitable insulating material may be used between the unit and the door 13.

In addition to carrying some of the apparatus directly on its inner face, the door 13 is preferably provided with means comprising an inwardly extending platform 58 in the form of a plate. This may be secured at its rear edge against the lower portion of the inside face of the door 13 as by means of a bracket 59 (FIGS. 3, 4 and 6) attached by screws 60 to the door. The bracket 59 has attachment foot flanges 61 to which the outer margin of the platform plate 58 is secured as by means of screws 62. An array of electronic devices 63 is adapted to be carried on a dielectric motherboard 64 secured as by means of screws 65 to the upper face of the platform plate 58. Various and sundry connectors 67 are provided for connecting the various parts of the electronic gear as is conventional for that purpose. All of the connectors have adequate leads of length to permit at least partial withdrawal of the door 13 for access to the connectors for easily effecting connections and separations.

In the fully installed condition of the door 13, the inner margin of the platform plate 58 is engagable with a stabilizer lug 68 (FIGS. 3 and 5) which is fixed to the upper surface of the bottom wall 17 of the front part 11. A rearwardly opening slot 69 in the lug 68, is positioned to receive the margin of the platform plate 58 and support such margin of this plate against sagging when the platform plate is fully inserted within the housing. A diagonal leadin surface 70 slants upwardly and forwardly to the entrance into the slots 69 for assuring smooth guidance of the edge of the plate 58 during the assembly maneuver. The lug 68 relieves cantilever strain on the plate 58, and more particularly strain at its attachment bracket 59.

Means are provided for attaining good ventilation of the chamber 31. For this purpose, an array of narrow ventilation slots 71 extends across a front portion 72 of the bottom wall 17 (FIG. 3) directly under the CRT 21. For ventilation effeciency, the front portion 72 is tilted upwardly and forwardly so that the ventilation slots 71 will remain unobstructed even if the remainder of the bottom wall 17 engages upon an object or surface.

Aside from the ventilation slots 71, the front part 11 preferably remains solid and unported, thus providing an efficent radiation shield about the CRT 21. Where the front part 11 is formed from metal, such as aluminum, the narrow ventilation slots 71, which are just a few thousands of an inch wide, and the width of intervening metal at least as wide as the width of the slots, ample absorption of random radiation by the metal surrounding the slots will avoid migration of the radiation beyond the slots. For example, in a length of about 10 or 12 inches in the front portion 72, there may be on the order of 35 of the slots 71 extending in a front to rear direction and located in spaced parallel relation.

On the other hand, a substantially greater slotted ventilation area is desirably provided in the walls of the rear part 12 where there is less of a radiation problem. For example, there may be as many as 52 parallel ventilation slots 73 in the top wall 25 (FIGS. 1–3) and an equal number of ventilation slots 74 in the bottom wall 28 (FIG. 4) and of a length so that the ventilaton area grid provided by the slots 73 and 74 occupies a large part of the area of the walls 25 and 28. In addition, each of the side walls 27 (FIGS. 1 and 5) has generally horizontally running ventilation slots 75, desirably arranged in two groups spaced apart vertically. In the illustrated instance there are seven of the ventilation slots 75 in each of the groups. The metal grids in which the ventilation slots are located provide ample radiation shielding.

Additional ventilation is afforded by means of an array of vertically extending parallel slots 77 extending across the major transverse extent of the upper portion of the door 13. These slots may be spaced apart by solid metal about twice the width of the slots.

As previously alluded to, where the housing shell components of the housing 10, i.e. the front and rear parts 11 and 12 and the door 13, are made from aluminum, there is ample radiation shielding gained from the metal about and in the web portions between the various arrays of ventilation slots so that any other shielding means need not be used. Of course, if the housing components are made from nonmetalic material it may be necessary to place shielding screens or the like across the arrays of ventilation slots.

It will be understood that not all of the electrical and electronic apparatus that may be needed for operation of the CRT 21 has been shown in detail in the drawings, because the invention is not directed to that apparatus as such, but to the housing structure. Some of the apparatus has been depicted in more or less accurate detail where desirable for illustrative purposes in respect to any particular of the housing components.

It will be understood that variations and modifications may be effected without departing from the spirit and scope of the novel concepts of the present invention.

I claim as my invention:

1. A computer monitor console housing:
   a cast aluminum casing having top, side and bottom walls defining a chamber receiving console apparatus and having a front end and a back end;
   means mounting the console apparatus within said chamber;
   said front end having an opening mounting a console apparatus CRT on said casing front end in a visibly exposed relation to said opening;
   said back end having an access port through which said console apparatus within said chamber is accessible;
   a replaceably removable closure for said access port;
   means replaceably securing said closure in radiation leakproof joinder to said back end in closing relation to said access port;
   said closure having means thereon supporting some console apparatus to be inserted and removed from said chamber on said closure serving as a carrier;
   and said casing comprising a pair of shells, means securing said shells together, one of said shells having said front end opening, and the other of said shells having said back end access port, said other shell having a seat about said port receiving said closure.

2. A housing according to claim 1, wherein said closure comprises a panel having its margins engaging said seat.

3. A housing for electronic apparatus such as a computer monitor comprising:
   a casing defining a chamber and having a front end and a back end;
   said casing comprising two cast aluminum shells one of which provides said front end and the other of which provides said back end;
   means securing said shells in such close edge-to-edge relation that radiation leakage is precluded through the joint between said shells;
   said front end shell having an opening for mounting an electronic instrument such as a CRT with its screen visibly exposed at said opening;
   said back end shell having at its back end an access port providing for full access into said chamber;
   a removable aluminum closure for said access port;
   means removably securing said closure to said back end of said back end shell in closing relation to said access port, with the joint between said closure and said back end shell being radiation leak proof;
   said closure carrying on its inner side means for supporting apparatus.

4. A housing according to claim 3, wherein said supporting means comprises a platform plate extending inwardly in a cantilever fashion from the lower portion of said closure.

5. A computer monitor console housing:
   a cast aluminum casing having top, side and bottom walls defining a chamber receiving console apparatus and having a front end and a back end;
   means mounting the console apparatus within said chamber;
   said front end having an opening mounting a console apparatus CRT on said casing front end in a visibly exposed relation to said opening;
   said back end having an access port through which said console apparatus within said chamber is accessible;
   a replaceably removable closure for said access port;
   means replaceably securing said closure in radiation leakproof joinder to said back end in closing relation to said access port;
   said closure having means thereon supporting some console apparatus to be inserted and removed from said chamber on said closure serving as a carrier;
   said supporting means including a platform attached to said closure and projecting forwardly in cantilever fashion within said chamber and with said some console apparatus supported on said platform.

6. A housing according to claim 5, wherein said platform extends in a cantilever fashion from said closure and means within said casing providing auxiliary support for the front end of said platform when the platform is fully assembled within the casing.

7. A housing according to claim 6, including means on the lower portion of said closure securing said platform to the closure, and said means providing auxiliary support comprising a notched lug fixed within the front portion of said casing and into which a margin of said platform is engaged in the fully assembled relation.

8. A housing according to claim 7, wherein said lug has a notch therein facing generally toward said closure receiving said margin of said platform, and a leadin surface facilitating entry of the margin of the platform into the notch when effecting assembly of said platform toward said lug.

9. A housing according to claim 5, including an attachment bracket, and means securing said bracket to said closure and to said platform.

10. A computer monitor console housing:
 a cast aluminum casing having top, side and bottom walls defining a chamber receiving console apparatus and having a front end and a back end;
 means mounting the console apparatus within said chamber;
 said front end having an opening mounting a console apparatus CRT on said casing front end in a visibly exposed relation to said opening;
 said back end having an access port through which said console apparatus within said chamber is accessible;
 a replaceably removable closure for said access port;
 means replaceably securing said closure in radiation leakproof joinder to said back end in closing relation to said access port;
 said closure having means thereon supporting some console apparatus to be inserted and removed from said chamber on said closure serving as a carrier;
 said casing comprising a front end cast aluminum shell and a back end cast aluminum shell, means tightly joing said shells separably in edge-to-edge relation, said closure comprising an aluminum panel and a seat for said closure panel about said port, said means securing said closure panel effecting a tight engagement of said closure panel with said seat entirely about said port.

* * * * *